United States Patent [19]

Cann

[11] 4,404,456
[45] Sep. 13, 1983

[54] MICRO-ARC WELDING/BRAZING OF METAL TO METAL AND METAL TO CERAMIC JOINTS

[76] Inventor: Gordon L. Cann, P.O. Box 279, Laguna Beach, Calif. 92652

[21] Appl. No.: 247,770

[22] Filed: Mar. 26, 1981

[51] Int. Cl.³ .............................................. B23K 9/00
[52] U.S. Cl. ............................... 219/137 PS; 219/75; 219/127
[58] Field of Search ..................... 219/137 PS, 127, 75

[56] References Cited

U.S. PATENT DOCUMENTS 3,366,772  1/1968  Wickham et al. ..................... 219/75
3,471,675 10/1969  Sargent et al. ....................... 219/75
3,487,195 12/1969  Denis et al. ................... 219/137 PS

OTHER PUBLICATIONS

T. Lyman et al., *Metals Handbook*, 8th Edition, vol. 6, "Welding & Brazing", pp. 113–126, 1971.

*Primary Examiner*—C. C. Shaw
*Attorney, Agent, or Firm*—Sherman & Shalloway

[57] ABSTRACT

Method and apparatus for micro-arc brazing and welding of metal to metal or ceramic. The control of arc heat flux density is accomplished by controlling the ambient gas pressure and providing an argon, argon/5% hydrogen or other inert gas atmosphere. The discharge current is controlled so as to provide an arc which is operable at 100 microamps to 20 amps.

Prior to welding or brazing, the work is cleaned by high frequency electrical discharge cleaning techniques using high energy ions from either the ambient gas or from an electrode. By providing a small amount of DC during the high frequency discharge a "tinning" capability is established.

The welding or brazing may be formed in a closed chamber so that arc stabilization can be accomplished.

21 Claims, 17 Drawing Figures

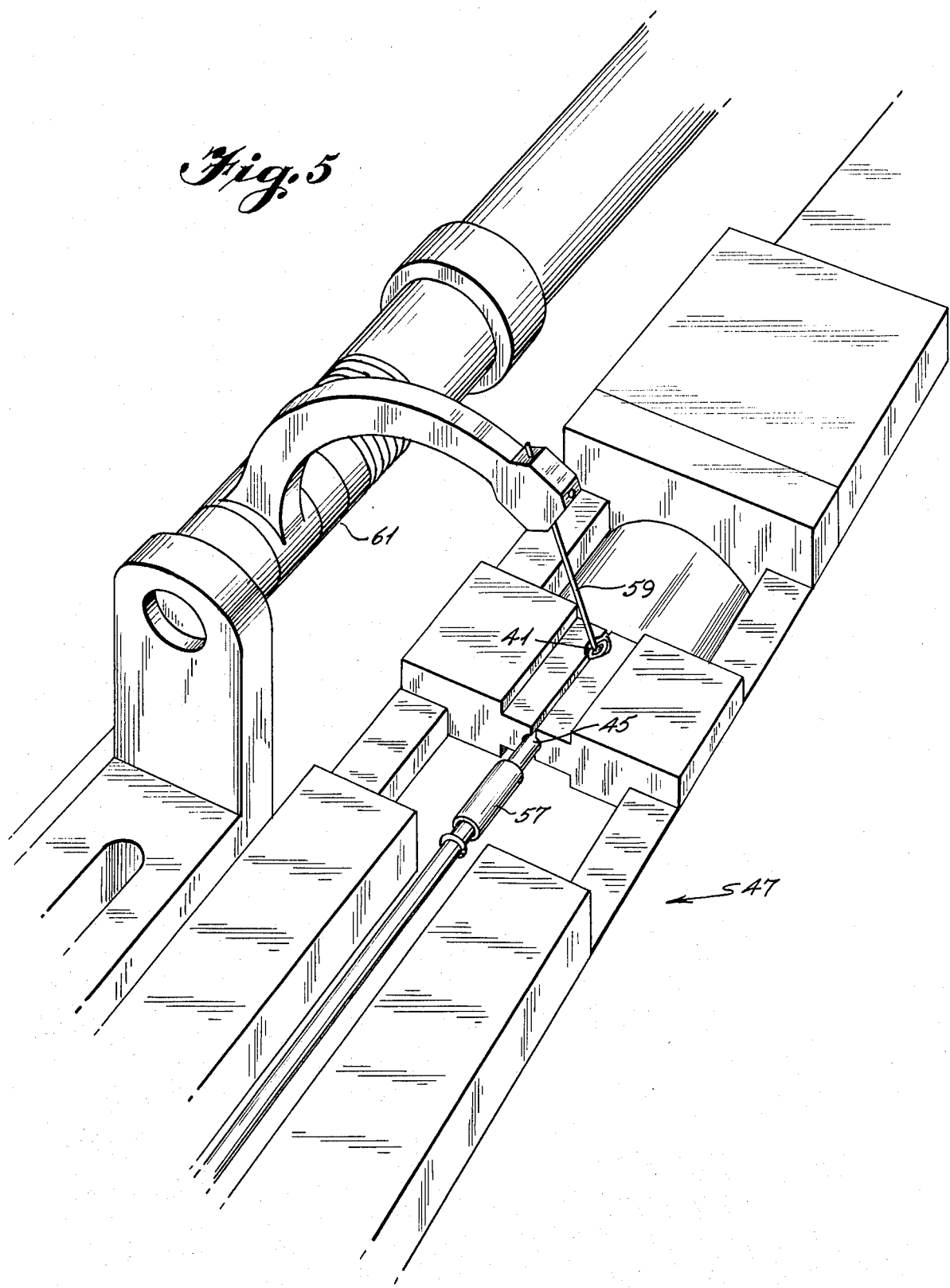

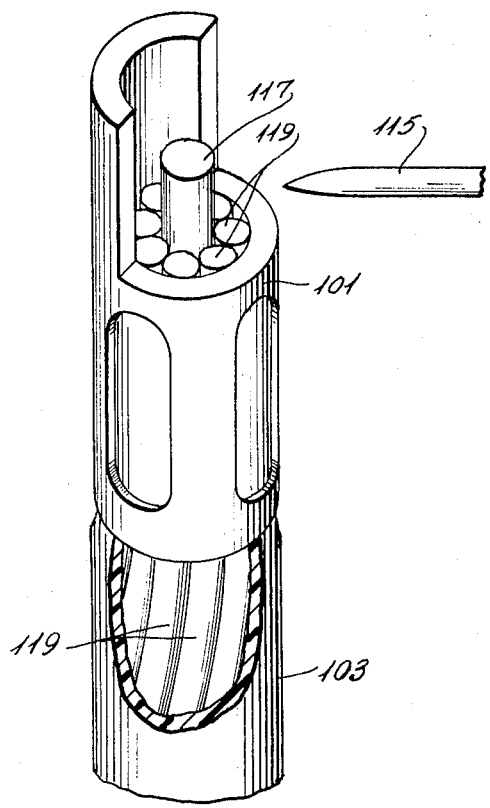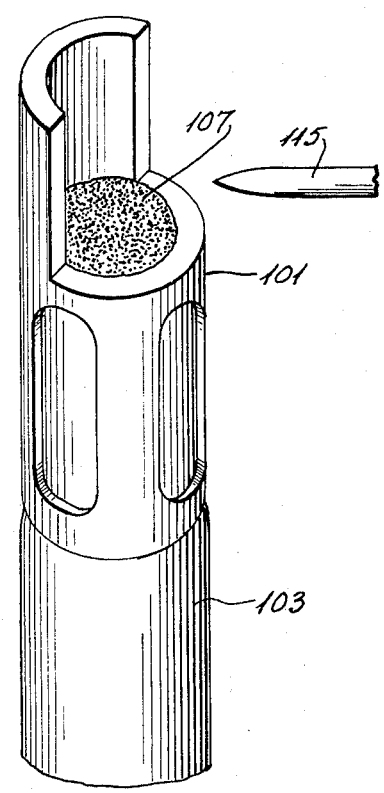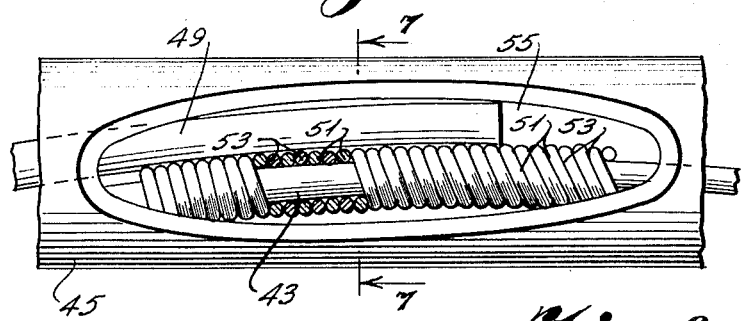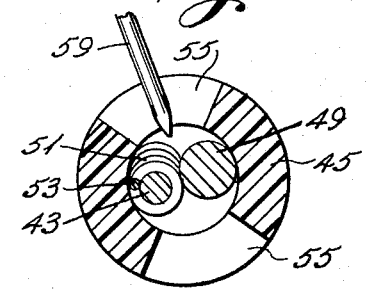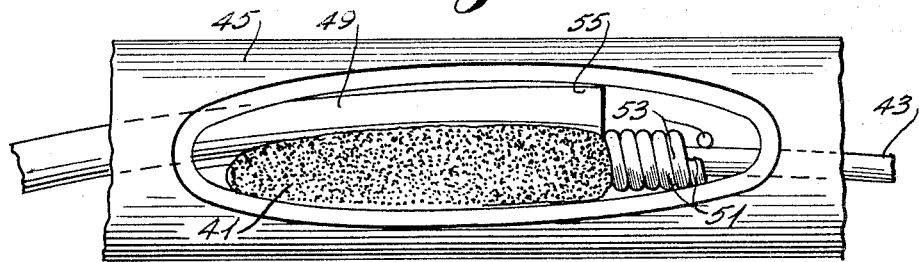

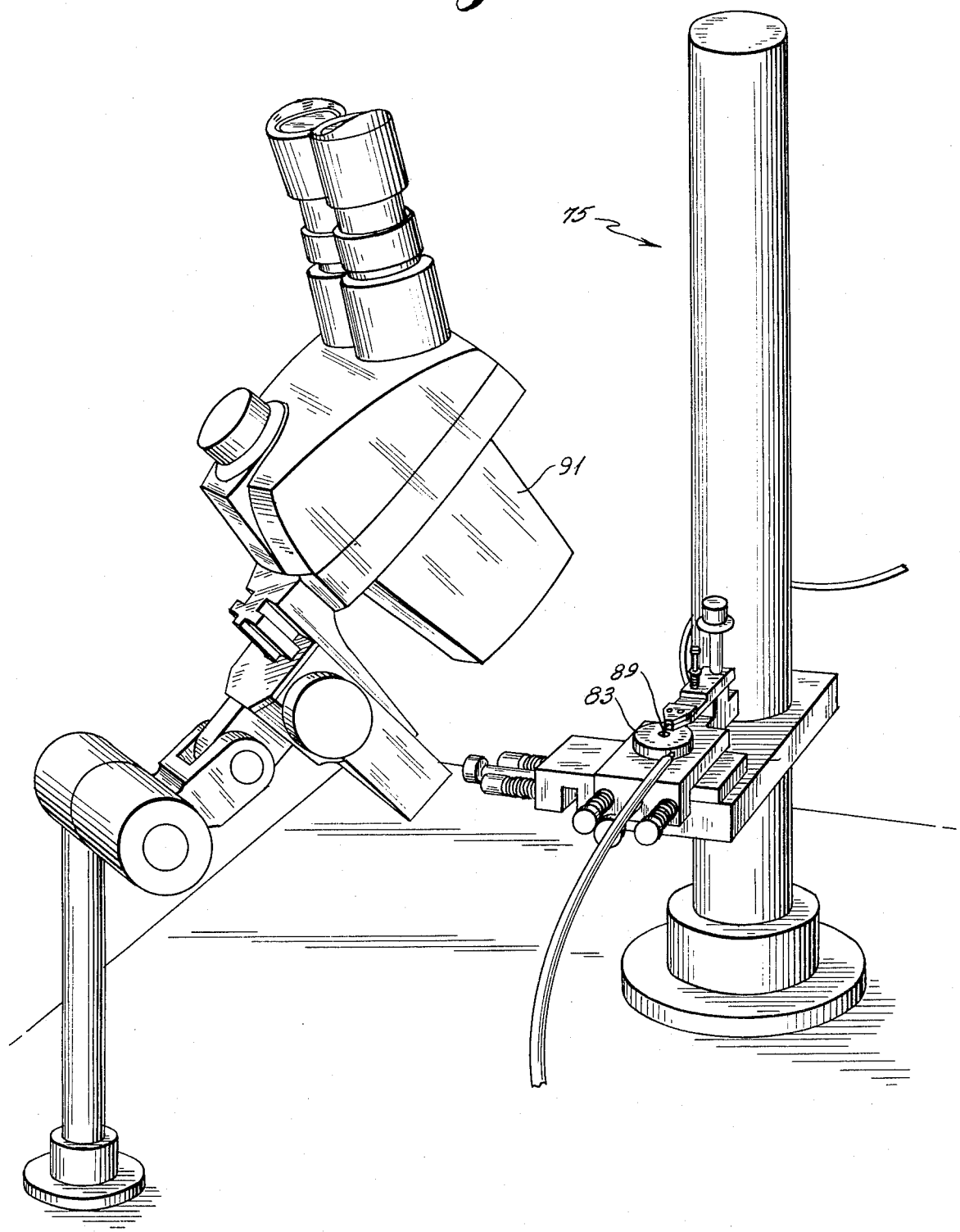

Fig. 10
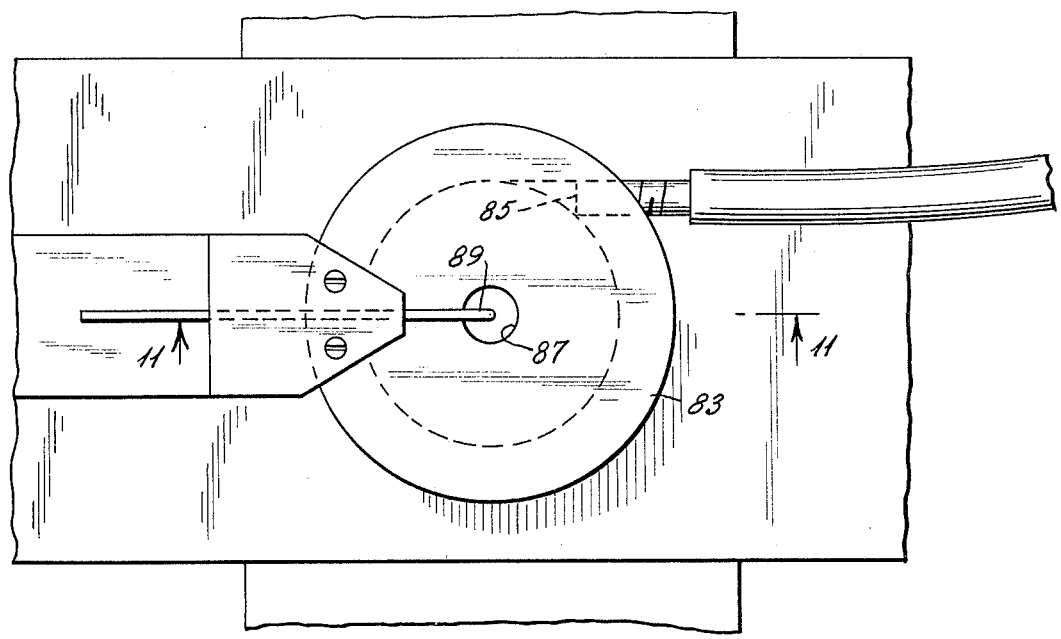
Fig. 11
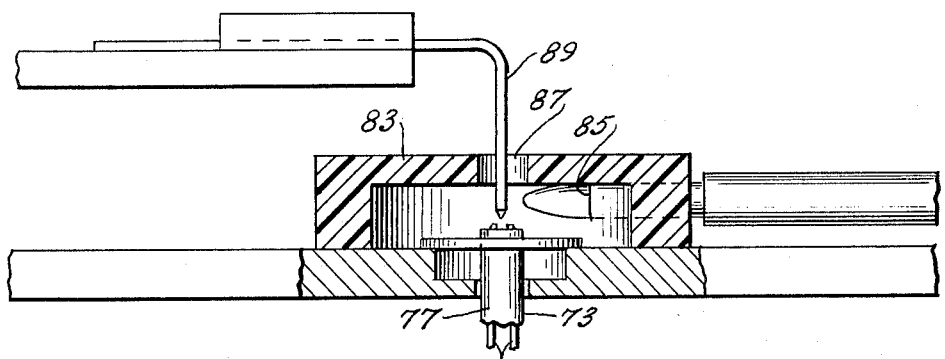
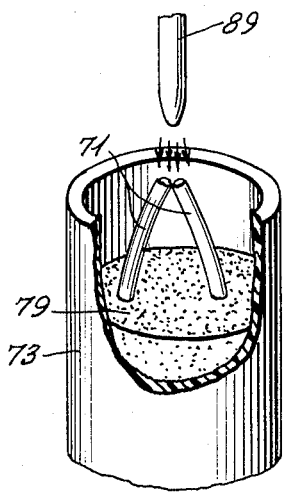
Fig. 12
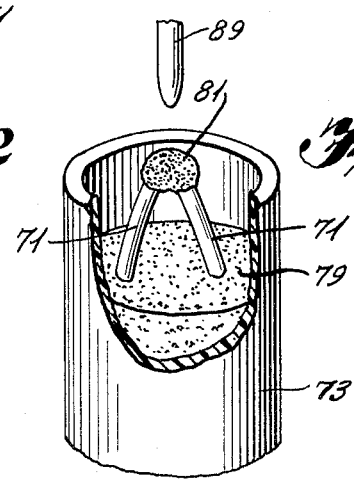
Fig. 13

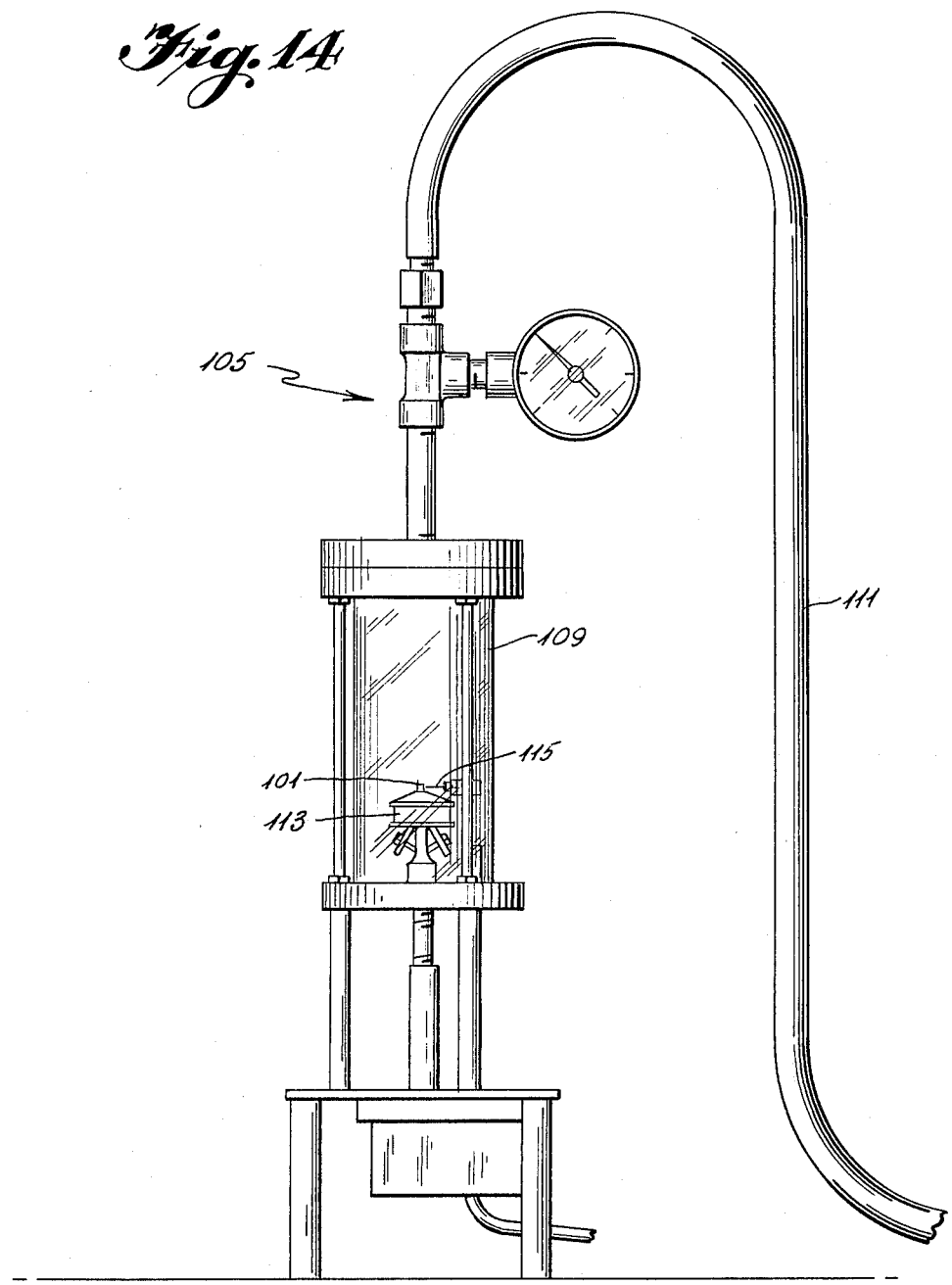

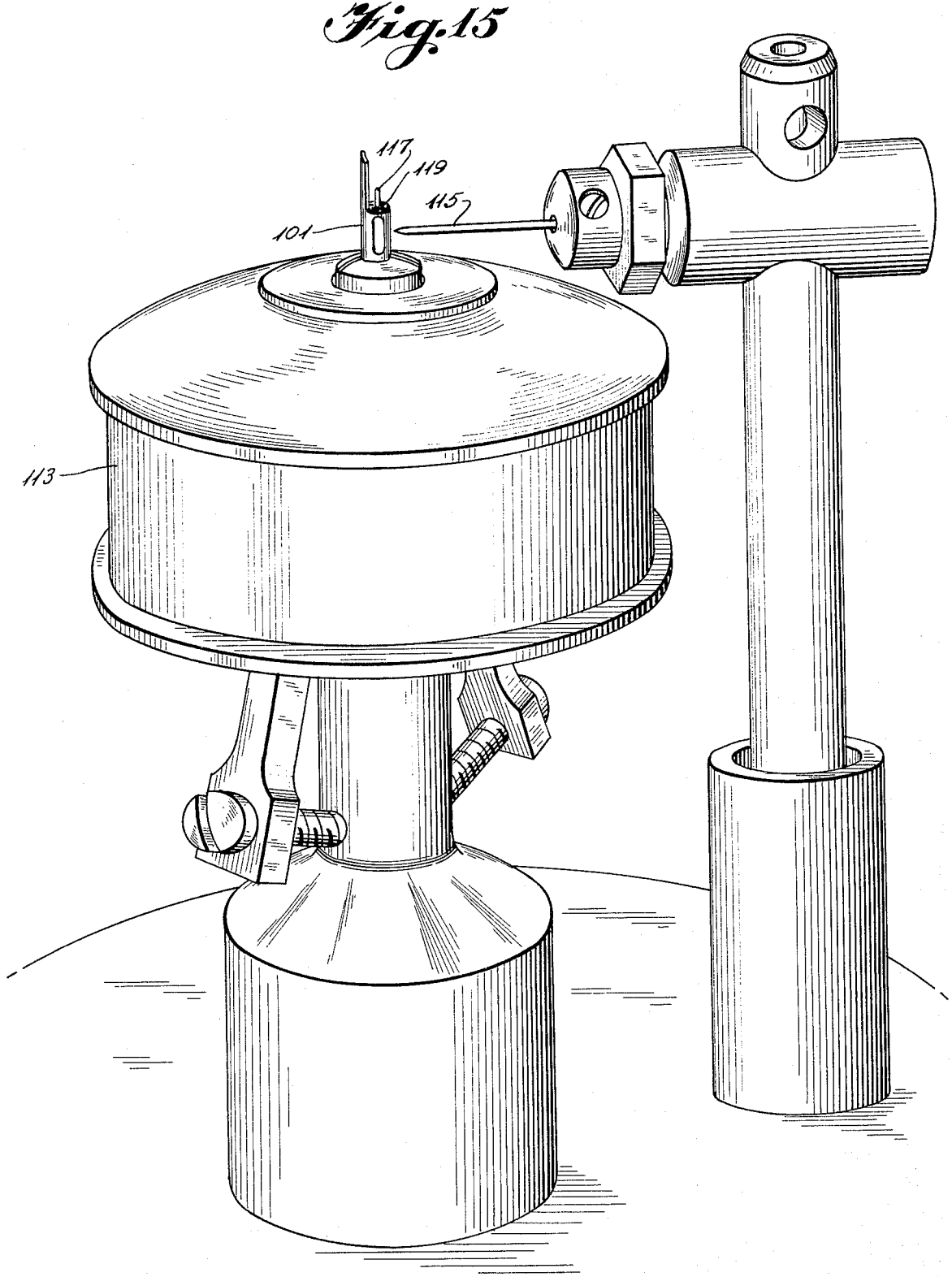

MICRO-ARC WELDING/BRAZING OF METAL TO METAL AND METAL TO CERAMIC JOINTS

BACKGROUND OF THE INVENTION

Machinery and electronic devices are becoming more and more sophisticated at an extremely rapid rate. An important element of this sophistication is the need to join metal to metal and metal to ceramic parts in more reliable and reproducible methods, often at high temperature (over 1000° C.) and often without the use of flux or other chemical cleaning processes. A proliferation of techniques have been developed to meet these needs.

These include but are not limited to:
high temperature vacuum and inert gas furnace brazing
electron beam brazing and welding
laser beam brazing and welding
spot welders and brazers
ultrasonic bonders
heli-arc machines
acetylene torches
mechanical bonding using electromagnetic forces
soldering irons and guns
plasmatrons or plasmajets
ion beams For the most part, these developments have been empirical. Many of them also have one or more of the following undesirable characteristics:
require specialized, expensive equipment
require highly trained personnel to operate, i.e. cannot be machine programmed
do not give reproducible results
require the use of chemical cleaning agents which can contaminate critical compounds and limit the lifetime of the device
each new joint must be developed through the use of many samples which can be very expensive and time consuming
lack of temperature control can cause unacceptable thermal stresses, unacceptable recrystallization in components, damages to neighboring components.

In any brazing or welding operation some provision must be made to accomplish the following processes:

(i) mechanically join or position the parts to be brazed or welded (ii) choose an optimum braze material (iii) properly position the right amount of braze and weld material or arrange to feed it at the proper rate during brazing or welding (iv) establish a non-corrosive atmosphere (v) clean, selectively if possible, the surfaces that are to be joined (vi) if the parts are to be brazed, wet or coat the appropriate surfaces with a thin layer of material, usually the same as the braze material (vii) heat the desired surfaces to the optimum temperature at the optimum rate.

(viii) ensure that the braze or weld material flows to the desired location (xi) cool the joint at an optimum rate.

Ensuring that the steps outlined above are done in the proper sequence is extremely important in most cases. For instance, if the braze melts and flows before the surfaces are cleaned and wetted, it will ball up and often fall off of the metal parts or move to some undesirable position. There is little or no problem associated with accomplishing steps i and iv in proper sequence. However, steps v through viii are often all accomplished by applying heat to the joint. Ensuring that these steps are effected in the proper sequence becomes one of the prime requirements of the heating system. There is, however, some flexibility in the sequencing of these steps.

Besides ensuring the proper time sequencing of the steps noted above, the steps are strongly coupled so that any change in one step could strongly influence any of the other steps. For instance, heating a vacuum furnace rather than a hydrogen furnace could alter the decisions that must be made to properly accomplish steps ii, v, vi, vii, viii, and ix.

Until now, the physics and physical processes that determine the multiple interactions and proper sequencing of events during brazing or welding often have not been identified or even well understood. This is especially true in cases where an electrical discharge is used to supply the heat, because of the notorious "perversity" of arc discharges. Great strides, however, have been made in understanding and optimizing arc electrical discharge phenomena over the past 20 years. Many of these developments were accomplished in areas of technology not familiar to the average arc welding expert, e.g. space propulsion engines. Often, these developments were not reported in the open literature, hence this information was confined to a small group of plasma physicists. This can account for the almost universal use of "primitive" arc devices and technology in most present day heli-arc operations, as well as heli-arcing being more a "black art" rather than a well established technological process.

As stated above, rapid developments in other areas of technology as well can have profound implications towards the development of a scientific approach to welding and brazing. Specifically, the significant advances in our understanding of physi- and chemi-sorbed layers and how to control them have been made by scientists working in the space program. High speed, high capacity computers have made the solution of complicated heat-transfer problems routine. The development of solid state devices and associated electronics now permit better than 1% control of current, voltage or power in direct current power supplies.

SUMMARY OF THE INVENTION

Accordingly, it is an object of this invention to provide a precisely controlled method and apparatus for welding and brazing small components.

It is a further object of the invention to provide a method for welding and brazing using arc currents which are precisely controlled so as to permit fusion or bonding at a specified limited area which can be made smaller and can be more accurately predetermined than had been hithertofore possible.

It is a further object of the invention to provide a method for welding or brazing joints within a small confined area while minimizing the thermal stresses which would normally occur in the surrounding area.

It is a further object of the invention to provide an arc welding and brazing technique wherein the arc is maintained in a stable condition even at low current values.

It is a further object of the invention to provide a method for arc welding or brazing wherein physical properties of the arc are pre-calculated in order to provide a stabilized arc at a minimum of temperature and current.

It is a further object of the invention to provide a method of apparatus wherein an arc is stabilized by controlling the arc current in accordance with the physical properties of the arc and by providing a vortex gas flow around the arc.

It is a further object of the invention to provide a method and apparatus wherein an arc is provided with an enveloping gas which has controlled flow characteristics.

It is a further object of the invention to provide the method of apparatus for stabilizing an arc used for welding and brazing wherein the arc is maintained in a stabilized condition, even at relatively low current values, by maintaining a vortex in an enveloping gas which has high-speed flow characteristics.

It is a further object of the invention to provide an apparatus which is adaptable to welding at relatively high voltages and low current values so as to provide a stabilized arc wherein the current value, gas pressure, time of arc discharge, and cathode diameter and temperature are calculated in accordance with the physical properties of the arc and materials prior to welding.

It is yet a further object of the invention to provide a means for welding small components in limited space, while providing a relatively high strength for the resultant weld joint.

It is yet a further object of the invention to provide an apparatus which is capable of welding and/or brazing wherein the weld takes place over a small pre-defined area.

It is yet a further object of the invention to provide an apparatus where a high-speed vortex can be provided in an evveloping gas to facilitate the welding and/or brazing of materials with a carefully controlled arc.

It is still another object of the invention to provide a product having a welded joint, which joint is limited in size and high in mechanical strength.

Accordingly, in one aspect of the invention, a method is provided wherein a current level necessary to heat a material to a desired temperature for welding and/or brazing with an arc includes the steps of determining an effective radius for a fused joint, determining the current, pressure level and time necessary to obtain a desired temperature of fusion, and determining a cathode radius necessary to maintain thermionic emission from the cathode. The work is then positioned in a jig, the pressure is established and the fusion site is heated to the desired temperature, with an arc maintained for a precisely controlled amount of time. The work may be surrounded by an inert enveloping gas and the gas may be caused to flow at a high-speed vortex with speeds near the center of the vortex approaching MACH one. When the vortex gas flow is used, the enveloping gas flow carries vaporized material away from the work.

In a further aspect of the invention, an apparatus is provided for thermally fusing electroconductive materials together by applying an electric arc to the materials wherein stabilized current is provided at a value which is predetermined in accordance with pressure and required energy discharge, with the current being maintained for a precisely controlled period of time. A means is provided for enveloping the materials with a substantially inert gas which may also have reducing properties. The apparatus may cause the enveloping gas to flow in a vortex around the materials at a high rate of speed.

In another aspect of the invention, an arc welded or brazed fused joint having a precisely controlled area of fusion and relatively high strength is formed by thermally fusing at least some of the materials in the joint by steps which include determining an effective radius for the fused joint, as well as the current, pressure level and time necessary to obtain a desired temperature of fusion, and determining a cathode radius necessary to maintain thermionic emission from the cathode. The fused joint may be surrounded by an inert enveloping gas during the fusion and the gas may be caused to flow at a high-speed vortex with speeds near the center of the vortex approaching MACH one.

BRIEF DESCRIPTION OF THE DRAWINGS

FIG. 5 shows a jig used to braze two wires within an insulator according to one aspect of the invention.

FIG. 6 shows an arrangement for joining two wires in an insulator prior to a brazing operation according to the present invention.

FIG. 7 is a cross-sectional view taken along section 7—7 of FIG. 6.

FIG. 8 shows the arrangement of FIG. 6 after having been brazed in the jig of FIG. 5.

FIG. 9 shows a jig for welding two nichrome wires together in accordance with the present invention.

FIG. 10 is a top view showing details of the jig of FIG. 9.

FIG. 11 is a cross-sectional view, taken along section 11—11 of FIG. 10.

FIG. 12 shows two nichrome wires encased in a sheath to be joined in accordance with the present invention.

FIG. 13 shows the nichrome wires of FIG. 12 after having been joined in the jig of FIG. 9.

FIG. 14 shows a jig for brazing a lug onto an insulated wire in accordance with the present invention.

FIG. 15 shows details of the jig of FIG. 14 showing a mounting assembly for brazing the lug.

FIGS. 16 and 17 show the lug before and after, respectively, being brazed in the jig of FIG. 14.

DESCRIPTION OF THE PREFERRED EMBODIMENTS

Figure 1:
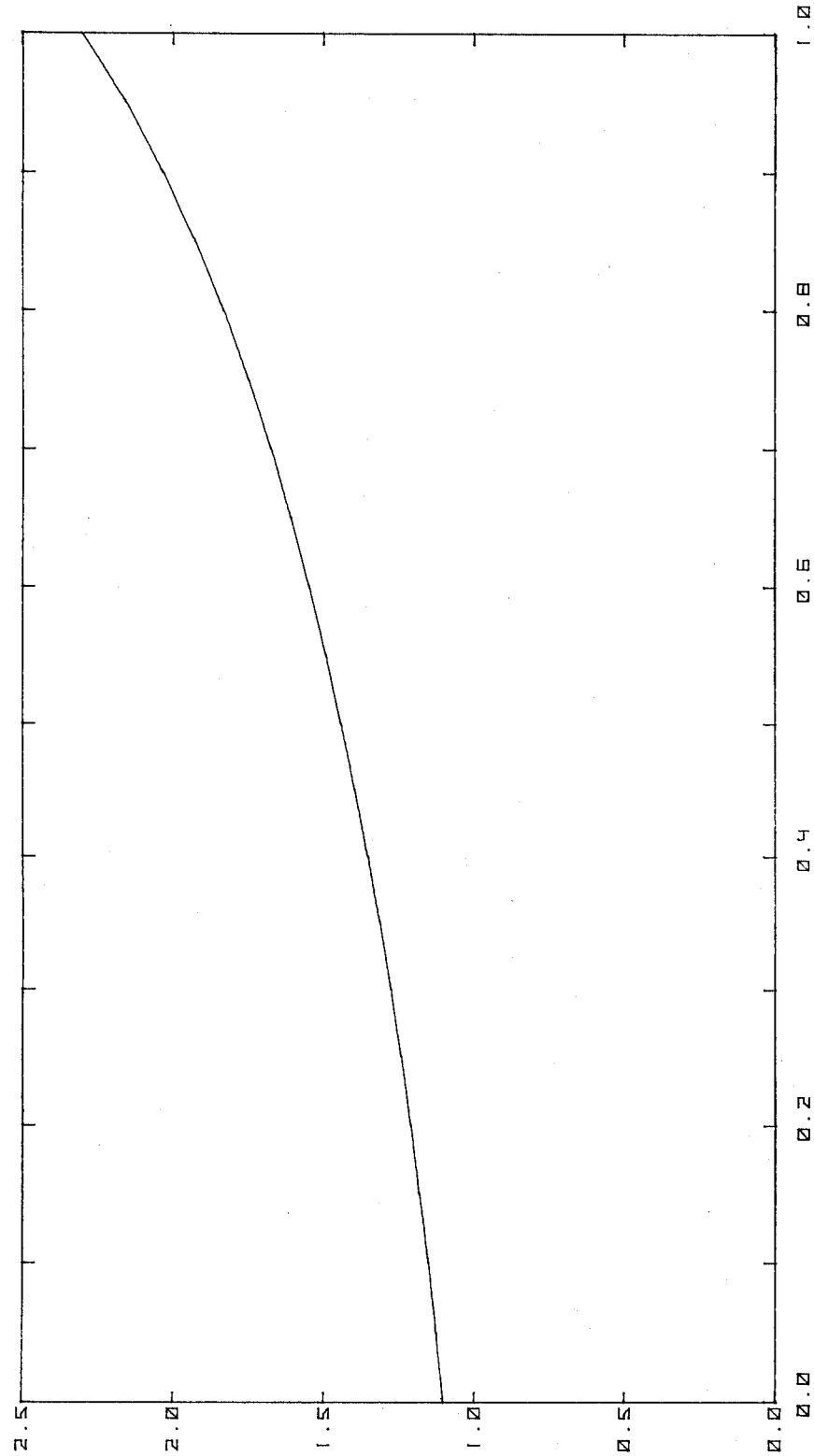
FIG. 1 shows a graphical display of non-dimensional time for heating the work vs. ratio of thermal conduction heat loss to total heat loss for a typical material, in accordance with the present invention.

The present invention takes advantage of the fact that physical properties of an arc, as well as the physical properties of materials being heated by an arc for thermal fusion (welding and/or brazing) can be fairly accurately calculated. While these calculations must be performed for each type of job, most commercial applications of thermal fusion involve repeat operations in which a large number of (preferably) identical parts are produced.

In order to minimize the size of a fused portion of the material to be joined (hereinafter called "work"), the arc current is maintained at a level slightly above a pre-determined minimum current required to melt the fusion materials and to raise the temperature of the materials to be fused to the desired temperature at the location of the fusion. The fusion materials normally are either braze or the puddle portion (melted material) of the weldment. In order to use this minimum current level, it is necessary to provide the current in an environment which would tend to stabilize the arc, rather than permit the arc to destabilize and rapidly move around a desired arc attachment point at the work.

As with conventional arc welding, an arc is discharged from a welding rod or cathode to an anode attachment point on the work. Sufficient current is caused to flow through the cathode and onto the anode attachment point to stabilize the arc and to cause thermionic amission from the cathode. In order to minimize this current, it is necessary to determine five parameters which must be properly controlled in order to accomplish any specific welding or brazing job. These quantities are:

(1) the discharge current, I;
(2) the ambient pressure of inert gas, p;
(3) the time over which the discharge current flows, t;
(4) the cathode diameter, dk; and
(5) the temperature of the cathode, $T_k$.

These quantities are functions of the physical properties of the material to be welded or brazed, of the ambient inert gas, and of the size and properties of the materials involved in the braze or weld.

In conventional arc welding techniques, the arc is stabilized by maintaining a relatively high discharge current. High discharge current insures that the arc will be stable at atmospheric pressure with a large variety of cathode diameters. The materials welded by conventional techniques are usually relatively thick, thereby eliminating the need to control the time over which the discharge current flows.

Because of the large current flow of conventional welding apparatus, it is not necessary to maintain the current in a relatively smooth or predictable wave form. That is significant because the electrical impedance across the arc is widely variable, thus resulting in wildly erratic fluctuation in arc current over short time periods, even though the average current value remains constant.

In order to reduce the arc current level, it is necessary to eliminate the radical fluctuations which normally occur in arc discharge devices. That is, of course, facilitated by the fact that significantly lower currents are being used. While stable current generators are readily commercially available, it is possible to construct such a stable current supply by using a high voltage power source capable of supplying current at at least the desired levels combined with a bank of resistors, such as an adjustable carbon pile. The carbon pile can be adjusted to a desired closed circuit current. If the resistance of the resistors is significantly greater than the impedence across the arc, then changes in the arc impedence will be relatively insignificant and therefore not cause any significant changes in the output current as long as the arc is maintained.

When it is desired to fusion bond a particular joint in accordance with the invention, it is first necessary to measure the size of the joint and assign it the following quantities:

$M$ = Mass of material that must be raised to the desired temperature.
$A_R$ = Surface area of material that will be radiating power.
$A_C$ = Cross-sectional area through which heat is conducted away from the joint material.
$L_{eff}$ = Effective conduction length—average length over which heat is conducted.

It is also necessary to determine the melting temperature $T_m$ of the brazed or weld material.

A ratio $\alpha$ of power conducted by the arc to total power losses at the anode attachment point is then determined, using the following formula:

$$\alpha = \frac{A_c \phi_M / L_{eff}}{A_R \epsilon \sigma T_M^4 + A_c \phi_M / L_{eff}}$$

$\phi_M$ = heat flux potential for material = $\int_{T_a}^{T_m} K \, dt$;

$\epsilon$ = emissivity of material;
$\sigma$ = Stefan-Boltzman constant for black-body radiation;
$T_m$ = Melting point of braze or weld material;
$T_a$ = ambient temperature °K.;
$T_m$ = melting temperature of the material °K. If a brazing operation is to be performed $T_m$ is the melting temperature of the solder or braze material;
$K$ = thermal conductivity constant.

A non-dimensionalized temperature value $\tau_w$ for the values of $\alpha$ is computed by the following formula:

$$\tau_w = \int_0^N dx \frac{1}{(1-\alpha)(1-x^4) + \alpha(1-x)}$$

where N is the proportion of equilibrium temperature selected as a minimum working temperature. In the preferred embodiment, N is >0.8 representing 80% equilibrium temperature.

A heating time $t_w$ must be precisely controlled in cases where a minimum size of a fused joint is desired. The heating time $t_w$ during which current is to flow is calculated by the following formula:

$$t_w = \frac{\sum_i M_i (h_M)_i \tau_w}{A_R \epsilon \alpha T_M^4 + A_c \phi_M / L_{eff}}$$

where
$M_i$ = mass of species, i;
$(h_M)_i$ = enthalpy of species i, including heat of fusion where appropriate.

The required current value I, required to accomplish the desired weld or braze is established in accordance with:

$$I = \frac{A_R \epsilon \alpha T_M^4 + A_c \phi_M / L_{eff}}{\partial V_I + \chi_w} \{(1-\alpha)(1-\tau a^4) + \alpha(1-\tau a)\},$$

where
$\delta$ = parameter (less than unity) defining a proportion of electron energy discharged at the anode attachment point of the work;
$V_I$ = ionization potention of gas or vapor near attachment zone to work;
$\chi_w$ = work function or work material;

$$\tau_a = \frac{T_a}{T_M} \approx \frac{300}{T_M(°K.)},$$

The required ambient pressure level (atm) required to establish the desired surface area of arc attachment or heating.

$$\text{atm} = \frac{p}{p_a} = \frac{kT_M}{p_a q_{ea}} \left[ \frac{27}{4} \frac{I}{\epsilon_0 V_I^{3/2}} A_R \sqrt{\frac{m}{2|e|}} \right]^{\frac{1}{2}},$$

where
k = Boltzmann constant;
p = pressure level;
$P_a$ = atmospheric pressure
$q_{ea}$ = cross-section for atom-electron collisions;
$\epsilon_0$ = capacitivity of vacuum;
m = mass of the electron;
|e| = electric charge the electron;
This established the pressure, current and time required for a given weld.

The next steps are associated with choosing a cathode diameter $d_k$, such that the cathode is heated to value $T_k$, to ensure adequate thermionic emission from the tip of the cathode in a time, $t_k$ much shorter than the time required to heat the work, $t_w$ Put $t_k = \beta t_w$, where
$\beta$ = proportionality constant, less than unity. Using the values of electric current, I, and heating time, $t_w$, the cathode parameters are established using the following equations:

$$T_k/T_{eq} = \frac{(1 + \gamma^4)^{\frac{1}{4}} \gamma \exp\{(1 + \gamma^4)\xi_k\}}{[1 + \gamma^4 \exp\{(1 + \gamma^4)4\xi_k\}]^{\frac{1}{4}}},$$

where
$\gamma = T_a/T_{eq}$;
$\xi_k = t_k/t_{ref}$;
$T_a$ = ambient temperature;

$$T_{eq} = \left( \frac{4I^2}{\pi 2 d_k^3} \frac{d\rho}{dT} \frac{1}{\sigma \frac{d\epsilon}{dt}} \right)^{\frac{1}{4}};$$

$\rho$ = resistivity of cathode;

$= \frac{d\rho}{dT} T$ (linearly dependent on the absolute temperature);

$\sigma$ = Stefan-Boltzmann constant for black body radiation;

$$t_{ref} = \left( \frac{\pi d_k^2}{4I} \right)^2 \rho_k \frac{C_p}{\frac{d\rho}{dT}};$$

$\rho_k$ = density of cathode material;
$C_p$ = specific heat of cathode material.

While the above calculations appear to be quite complex, the calculations would normally be performed by a computer, with the formulae incorporated into an appropriate program. Alternatively, most of the information may be graphically reproduced, either on a computer display or on paper as shown in the following examples:

EXAMPLE 1

FIG. 1 shows the relationship of $\tau_w$ to $\alpha$ for a particular material, with N=0.9 (90% equilibrium temperature). In this example, if $\alpha$ is established at 0.55, then $\tau_w$ could be read at 1.5, thus providing a value for $\tau_w$ without resorting to individual calculations.

EXAMPLE 2

Figure 2:
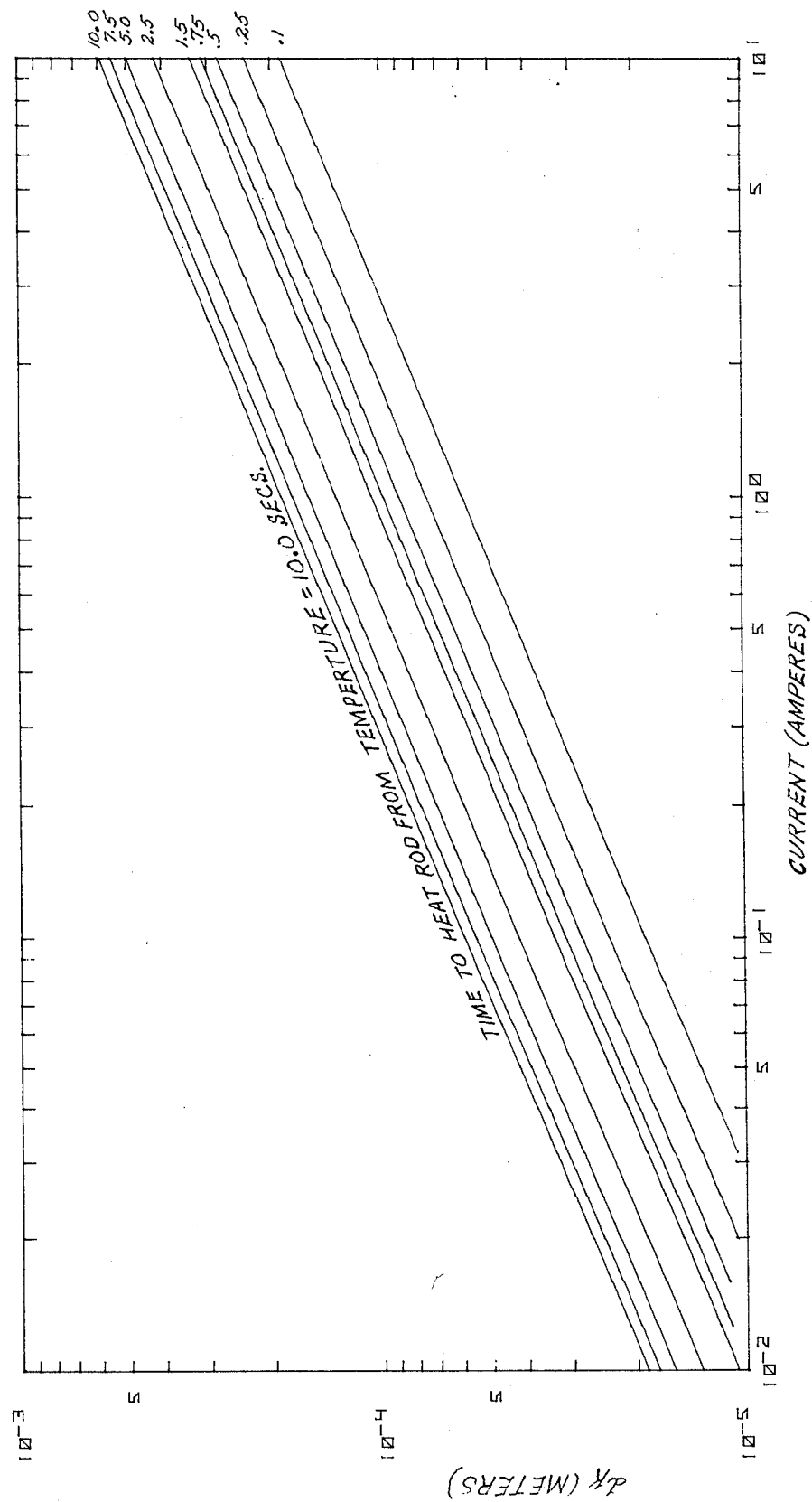
FIG. 2 shows a graphical display of rod diameters vs. current for different times to heat the rod in accordance with the invention.

FIG. 2 shows the relationships of cathode rod diameter $d_k$ and current at different times $t_k$ chosen for cathode heating. Choosing a small rod will reduce the time to heat the rod.

Figure 3:
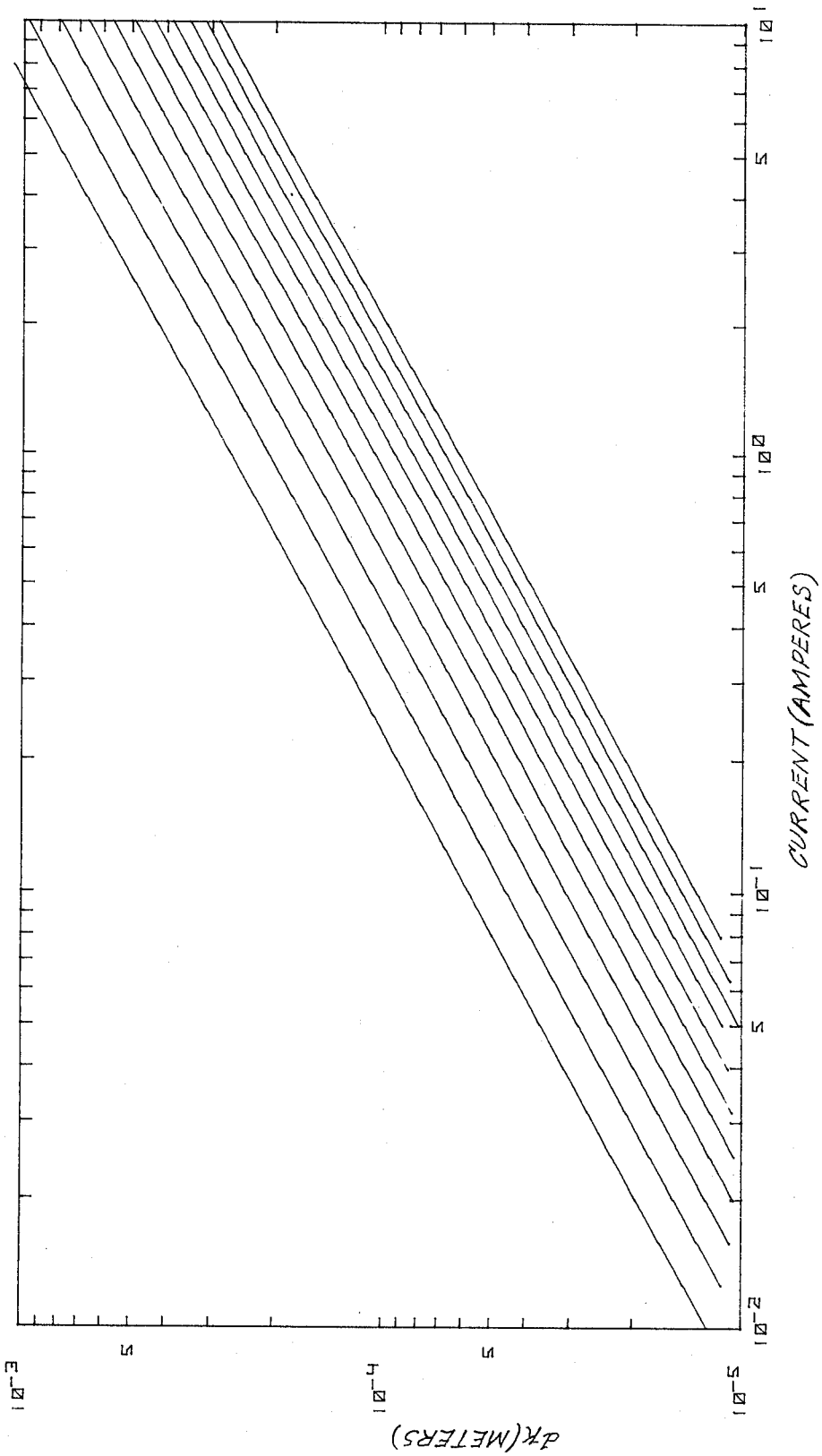
FIG. 3 shows a graphical display of rod diameters vs. current for different rod temperatures in accordance with the invention.
Figure 4:
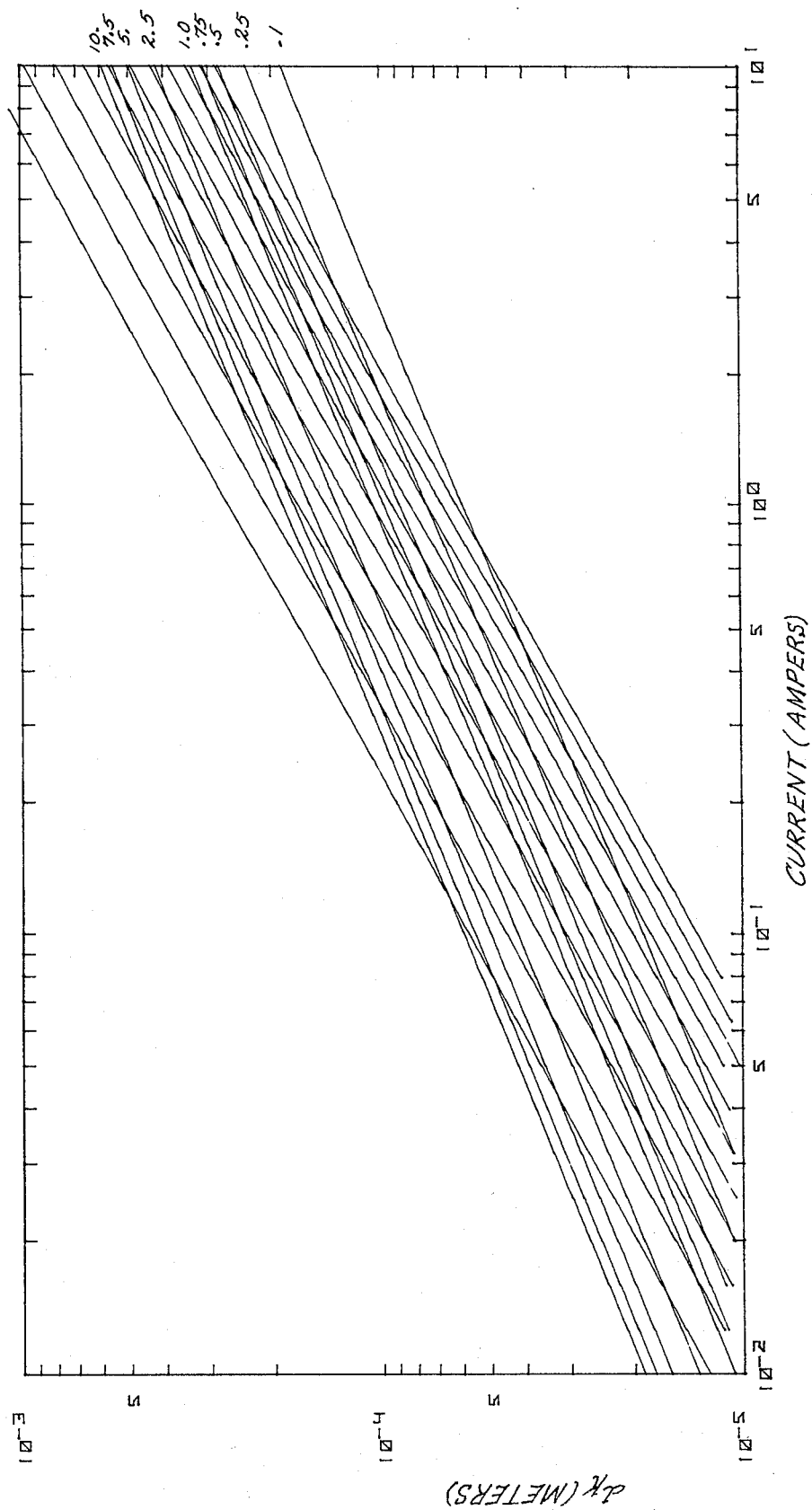
FIG. 4 is a combined graphical display showing the information of FIGS. 2 and 3.

FIG. 3 shows the relationships of cathode rod diameter $d_k$ and current at different rod temperatures $T_k$. $T_k$ must be less than the melting temperature of the rod, but sufficient to produce thermionic emission. Since clearly the rod temperature $T_k$ and time to heat the rod $t_k$ are interrelated, both dependent on rod diameter as a function of current, the values $T_k$ and $t_k$ may be shows on the same display, as seen in FIG. 4.

If the values $t_k$ and $T_k$ cannot be chosen within acceptable limits and the choice of rod materials (e.g., tungsten) does not place the values $t_k$ and $T_k$ within acceptable limits, a different pressure is chosen, the change in pressure being effected either by vortex flow or by static pressure controls. The change in pressure results primarily in a different current value.

A radio frequency signal can be provided at the cathode which would be transmitted to the work in order to cause localized heating and etch the surface of the work. The etching function is significant in that surface oxides can be removed by pre-treating the work with radio frequency, thereby performing a cleaning step during which the enveloping gas may be applied if beneficial as in the case of aluminum.

The localized heating function of the radio frequency energy enables a reduction in thermal stress caused by the arc fusion. A closely related function is the use of the radio frequency energy to heat treat metal, usually to "temper" the joint after fusion, by relieving molecular stress in the metal.

Typically radio frequency energy would be applied after the work is placed in a jig and the parameters (such as cathode diameter) have been established. The radio frequency energy at this point is primarily used for cleaning although some preheating of the work advantageously occurs. The use of radio frequency for cleaning is also important in applications where the use of a flux would be undesirable.

By providing an electrode of a suitable material, a "tinning" capability is provided, wherein, by including a DC component in the radio frequency current, the work is coated with some of the electrode material.

After arc fusion is effected, the radio frequency energy would be immediately applied to permit a slower cooling of the work, more even heat distribution during the cooling process and relief of molecular stresses at the joint. Thus the heat treatment occurs when the joint remains hot from the arc fusion.

The following examples are demonstrative of the application of my techniques. These examples appertain to an experimental program rather than the application of the invention on a commercial scale; however, these examples demonstrate some of the advantages and results of the invention:

EXAMPLE 3—High Temperature Joint 41 with a Very Small Diameter Wire 43 in an Insulator 45 in a Jig 47 (FIGS. 5-8)

(A) Objective:
(1) Hi-temp braze together a 0.009"d platinum wire 49 to a 0.0025"d W3Rh tungsten wire 43. The latter wrapped with a 0.003"d W3Rh tungsten wire 51 and 0.003"d Palco wire 53. The joint 41 is "blind", i.e. in both of two holes 0.017"d 55 of a two-bore 1/16" diameter piece of alumina 45.
(2) Use Palco Braze. Liquidus 1235° C. or 2255° F. Solidus 1230° C. or 2246° F.

(B) Constraints:
(1) Must maintain electrical insulation between two holes,
(2) Must maintain insulations of over 100 Meghoms between joint and a metal cylinder sleeve 57 (shown in FIG. 5 or the insulator 45 but moved away from the holes 55) placed later over the alumina;
(3) Cannot use flux for cleaning;
(4) Joint 41 must carry 0.5 amps of current for over 100 hours at temperatures of over 800° C.;
(5) May open slit through alumina for access to joint, but must later cover with the metal cylinder 57;
(6) Whole assembly cannot be heated to over 425° C.

(C) Prior Art Alternate Approaches to Micro-Arc that Were Tried:
Electron beam welding only. Electron beam welding produced joints with no better than 60% success ratio. Problems included burned and cracked alumina; non-satisfactory braze even after several attempts; burned-through tungsten wire 43; balled Palco 53 which contacted the metal cylinder 57; when placed over alumina 45; and contaminated alumina walls in cavity; resulting in unacceptable insulation resistance. The resultant joints were considered non-reproducable, and therefore the electron beam is technically not feasible for this type application on a commercial scale.

(D) Application of Micro-Arc
(1) The jig 47 was constructed in a housing (not shown) which was evacuated and provided with an argon (95%; 5% hydrogen) enveloping gas at 800 torr, creating a vortex flow around the joint 41 and a cathode 59. The jig had a spring loaded rod holder 62, permitting a touching of electrodes to initiate the arc.
(2) The technique was developed to point where it has a 95% success ratio, wiht one fusion attempt only. This was developed with several hundred samples. The procedure is automated, requiring no extensive special skills or expensive equipment. A technician must have experience working with miniature components under a 5-10 power microscope.
(3) Interwrap 0.003" Palco wire 53 and wrap wire 51: acts as heat sink to keep tungsten wire 4 to under 2250° F.
give good spatial distribution of braze to ensure good joint.
(4) Control discharge current to better than 5%.
(5) Control time of discharge to better than 5%.
(6) De-gas surfaces and then immerse in argon environment.
(7) Used "optimum" cathode diameter.

EXAMPLE 4—Weld to Very Small Diameter Wires 71 Encased in a Sheath 73 Using a Jig 75 (FIGS. 9-13)

(A) Objective:
Join together the two 0.003" Nichrome wires 71 at one end of a 60" length of sheathed cable 77. Sheath 73 O.D. is 0.019" and wires 71 embedded in mangesia 79.

(B) Constraints:
(1) Must maintain insulation resistance between sheath 73 and a joint 81 of over 100 Megohms.
(2) The joint 81 must carry current of over 0.2 amps at temperature of over 1800° F. for period of over 100 hours.
(3) Joint 81 must survive over 200 temperature cycles between 1800° F. and 100° F.
(4) Operating temperature near melting point of nichrome, hence must weld, rather than braze, wires 71 together.

(C) Prior Art Alternate Approach to Mini-Arc that was tried:
Parts sent out to shop experienced in making such joints in sheathed thermocouples. Vendor would attempt to make weld joints.
Of the 10 joints required, 2 were made after many tried. The remainder of sheath material retuned to us after 8 weeks and labelled defective. This is typical of this type weld requirement in the industry.

(D) Application of the Micro-Arc:
(1) The site of the joint 81 was positioned in jig 75 surrounded by a vortex generator housing 83. An argon enveloping gas (95% argon; 5% hydrogen) was injected through a nozzle 85 into the housing 83, with the gas escaping through a cathode opening 87. The resulting vortex surrounded the end of the wires 71 and a cathode 89. A microscope 91 permitted accurate positioning of the cable 77 and the cathode 89 in the jig 75.
(2) A technique was developed to the point where it has a 90% success rate with one or two attempts. This 90% success was demonstrated in tens of samples. The procedure is automated, requiring no special extensive skills or expensive equipment. A technician must have experience working with miniature components under a 5-10 power microscope.
(3) Established reliable and reproducible arc discharge with current of $\approx$100 milliamperes.
(4) Controlled arc current to better than 5% steady-state D.C. current.
(5) Designed reliable method of making connections for carrying the return current through the wires.
(6) Established and used "optimum" cathode diameter.

EXAMPLE 5—Lug 101 on Insulated Wire 103 Brazed Without Flux in Jig 105

(A) Objective:
(1) Braze a stainless steel or nickel lug 101 to a #24 stranded insulated copper wire 103 which is nickel coated.

(B) Constraints:
(1) Brazed joint 107 must survive a temperature of up to 500° C.
(2) Cannot use flux or chemical cleaning of parts because of possible contamination to adjacent components in lug assembly.
(3) Joint 107 must carry 0.5 amperes of current for over 100 hours at temperature of up to 250° C.

(C) Prior Art Alternate Approaches to Mini-Arc that were tried: None; all other approaches were not feasible.

(D) Application of Micro-Arc:

(1) The jig 105 was constructed to permit an evacuation and "purging" of a chamber 109 lug 101 with the insulated wire 103 is mounted on anode mount 113 with a cathode 115 mounted at the side of the lug 101. A high temperature braze material 117 was "jammed" into the end of the wire 103 between strands 119 of the wire 103. Because of the localized heating, the braze material 117 could simply be one of the strands 119 which extends away from the other strands, with all strands 119 being of the same material.

(2) A technique was developed to the point where it has a nearly 100% success rate with first fusion attempt after hundreds of welds. The procedure is automated, requiring no special skills or expensive equipment. A technician must have experience working with miniature components under 5–10 power microscope.

(3) Developed electromagnetic method of cleaning surfaces using hi-frequency discharge in atmospheric pressure argon.

(4) Developed unique method of supporting braze material in center of copper strands.

(5) Adapted arc technique to work successfully with "low-temperature" gold-tin eutectic braze.

The results of examples 3–5 can be seen in the following table

In the claims:

1. A method for welding a material at an anode juncture with an arc from a cathode so that at least some of the material is melted and flows together to form a unified weld, comprising the steps of (a) determining an effective radius, the effective radius being a portion of the material which is to be heated to a desired temperature during the heating;

(b) determining the current level necessary to heat the material to the desired temperature over the effective radius at a desired gas pressure range, said current level being determined through calculation of the formula $$I = \left[ \frac{A_R \epsilon a T_M^4 + A_c \phi M / L_{eff}}{\delta V_I + \chi_w} \right] \{(1-a)(1-\tau a^4) + a(1-\tau a)\},$$

where
$I$ = the current level
$A_R$ = surface area of material that will be radiating power
$\epsilon$ = emissivity of material
$a$ = the ratio of power conducted by the arc to total power losses at an attachment point of said anode juncture
$T_M$ = melting point of the material
$A_c$ = cross-sectional area through which heat is conducted away from the material
$\phi$ = heat flux potential for the material
$M$ = Mass of material that must be raised to the desired temperature
$L_{eff}$ = Effective conduction length-average length over which heat is conducted
$\tau a = T_a / T_M$ where $T_a$ = ambient temperature in °K.
$\delta$ = parameter defining a proportion of electron energy discharged at the anode attachment point of said material
$V_I$ = ionization potential of gas or vapor near said attachment point

TABLE 1

| | Example 3<br>Braze Platinum Wire<br>to Tungsten Wire | | Example 4<br>Weld Together Two<br>Nichrome Wires | | Example 5<br>Braze Nickel Wire<br>to Copper Wire | |
|---|---|---|---|---|---|---|
| | Range Investigated | 'Best' Value | Range Investigated | 'Best' Values | Range Investigated | 'Best' Value |
| Arc Current (Amps) | 2.0 to 0.5 | 1.20 | 0.5 to 0.1 | 0.18 | 2.0 to 0.5 | 1.20 |
| Open Circuit and Voltage (Volts) | 40–80 | 67 | 400–500 | 480 | 40–80 | 67 |
| Series Resistance (ohms) | 40–80 | 53 | 1000–4000 | 2660 | 40–80 | 53 |
| Time arc was on (sec) | .2 to 10 | 0.50 | .2 to 2.0 | 0.50 | 4–10 | 5–7 |
| Starting Technique | — | touch electrodes | — | hi-freq. | — | hi-freq. |
| Cathode Diameter (inches) | .005 to .020 | best value | .001 to .005 | best value | .005 to .020 | best value |
| Cathode Material | | Thoriated Tungsten | | Tungsten 3% Rhenium | | Thoriated Tungsten |
| Cathode Tip Shape | Flat to cone | 60° incl. cone | flat to cone | 60° incl. cone | flat to cone | 60° incl. cone |
| Cathode to work gap (inches) | .005 to .025 | .012" | | 0 to .050" | .005 to .025 | .010" |
| Ambient Gas Environment control | | argon evacuate 24 to 40 mm pressure fill with argon to 800 mm | | argon blow gas overwork | | argon "purge" chamber for 5 min. |

While specific examples have been used in order to demonstrate the application of the present invention, it is anticipated that various arrangements may be provided without departing from the scope of the present invention. For example, it is anticipated that the techniques of this invention may be used to fuse metals to non-metals. It is also anticipated that the present invention may also be used to etch both metals and non-metals for various applications. Accordingly, the present invention should be taken as defined in the claims and not limited in scope to the specific examples described.

$X_w$ = work function of work material, that is, energy electrons absorb upon entering the material;
(c) said current level being maintained within the range of 10 milliamps to 10 amps;
(d) determining a pressure level within said gas pressure range necessary to maintain a stable arc at the determined current level and obtain the desired penetration of the weld through calculation of the formula $$\text{atm} = \frac{p}{p_a} = \frac{kT_M}{p_a q_{ea}} \left[ \frac{27}{4} \frac{I}{\epsilon_0 V_j^{3/2}} A_R \sqrt{\frac{m}{2|e|}} \right]^{\frac{1}{2}},$$

where
atm = atmospheres of pressure
K = Boltzmann constant
P = pressure level
$P_a$ = atmospheric pressure
$q_{ea}$ = cross-section for atom electron collisions
$\epsilon_O$ = capacitivity of vacuum
m = mass of the electron
$|e|$ = electron charge of the electron;
(e) determining a time for which the current must flow in order to heat the material at the effective radius to obtain the desired temperature;
(f) determining a cathode temperature necessary to maintain thermionic emission;
(g) determining a cross-sectional area of the cathode necessary to maintain the cathode temperature at said current value, said cross-sectional area corresponding to a cathode diameter greater than 0.0004 inches and less than 0.009 inches;
(h) positioning the material to be heated in a jig so that the portion of the material which is to be elevated to the desired temperature is in close proximity to a cathode of the determined cross-sectional area;
(i) establishing the determined pressure at the portion of the material which is to be elevated to the desired temperature;
(j) applying electrical potential across the cathode and the material to be heated to desired temperature so that the desired current flows through the cathode for a desired amount of time, the current flowing in an arc between the cathode and the material which is to be heated to the desired temperature; and
(k) maintaining the current flowing through the cathode in a stabilized condition.

2. A method of claim 1 wherein the arc is initiated by impressing radio frequency current across the material to be heated to the desired temperature and the cathode.

3. The method of claim 1 wherein the arc is initiated by bringing the cathode into close proximity with the material to be heated to the desired temperature.

4. The apparatus of claim 1 wherein the arc is initiated by providing the initial high voltage between the cathode and the material to be heated to the desired temperature.

5. The method of claim 1 wherein the work is enveloped with a gas, the majority of which is inert.

6. The method of claim 5 wherein the enveloping gas comprises at least 80% inert components and at least 95% of the gas is selected from a group having inert or reducing properties, said method being carried but in a closed chamber.

7. The method of claim 1 wherein a gas flow is established around the material to be heated so as to create a vortex adjacent the material to be heated.

8. The method of claim 5 wherein the enveloping gas is caused to flow adjacent to the material to be heated in the vortex.

9. The method of claim 8 wherein said vortex surrounds the arc.

10. The method of claim 9 wherein a portion of the enveloping gas in the vortex is caused to flow at speeds close to MACH 1, the enveloping gas flow carrying vaporized material away from the material to be heated to the desired temperature.

11. The method of claim 1 wherein welding is effected by heating of the material.

12. The method of claim 1 wherein soldering is effected by the heating of the material.

13. The method of claim 12 wherein said soldering effects a brazed joint.

14. The method of claim 1, wherein current having a radio frequency is applied through the cathode to the material to treat the material.

15. The method of claim 14 wherein the radio frequency current is used to clean the material to be heated.

16. The method of claim 14 wherein the radio frequency current is used to thermally treat the material.

17. The method of claim 1 wherein the time for which the current must flow is determined by an analytical formula for arc induced heating.

18. An apparatus for thermally fusing materials together, the location of said fusion being defined as work, by applying an electric arc to the work, the apparatus comprising:
(a) a power supply capable of producing a stabilized continuous output current at a predetermined value;
(b) a fixture for holding the materials to be fused together in a desired position;
(c) means for enveloping the work with a substantially inert gas having a rate of transfer of energy no greater than that of a mixture of 75% argon and 25% hydrogen at a standard temperature and pressure;
(d) a cathode of a cross-sectional area; corresponding to a diameter less than 0.009 inches
(e) electrical connecting means connecting the cathode to the power supply;
(f) a means for holding the electrode;
(g) further electrical connection means for electrically connecting the power supply through an arc attachment point, the arc attachment point permitting the arc to pass from the cathode and engage the materials to be fused together;
(h) a means for applying the continuous output current of less than 10 amps from the power supply across the work and the cathode for a predetermined amount of time, the time controlled to ±0.01 sec., the predetermined time, a current value for the continuous output current, the cross-sectional area of the cathode and the pressure being predetermined so as to establish a stable arc and to fuse metallic materials substantially only within an area wherein said fusion is desired.

19. The apparatus of claim 18 wherein the means for enveloping the materials with a substantially inert gas is capable of establishing a vortex around the arc, so that a net flow of the substantially inert gas is away from the location of said fusion.

20. The apparatus of claim 18 wherein the means for enveloping the materials with a substantially inert gas includes a closed chamber and is capable of establishing a vortex around the arc and causing the enveloping gas in at least a portion of the vortex to flow at speeds close to MACH 1.

21. In a fused joint of materials formed by thermally inducing interfusion of at least some of the materials in the joint, the improvement comprising the location of interfusion being limited in dimension while maintaining a mechanical strength of the fused joint at approximately that of the weakest of the materials joined by forming the fused joint in the steps of:
  (a) determining an effective radius, the effective radius being a portion of the materials which is to be heated to a desired temperature during the heating;
  (b) determining the current level less than 10 amps necessary to heat the materials to the desired temperature over the effective radius at a desired gas pressure range;
  (c) determining the pressure level within a gas desired gas pressure range necessary to maintain a stable arc at the determined current level;
  (d) determining a time for which the current must flow in order to heat the material at the effective radius to obtain the desired temperature;
  (e) determining a desired cathode termperature necessary to maintain thermionic emission;
  (f) determining a cross-sectional area of the cathode corresponding to a diameter less than 0.009 inches necessary to maintain the desired cathode temperature at said current value;
  (g) positioning the material to be heated in a jig so that the portion of the material which is to be elevated to the desired temperature is in close proximity to a cathode of the determined cross-sectional area;
  (h) establishing the determined pressure at the portion of the material which is to be elevated to the desired temperature;
  (i) applying electrical potential across the cathode and the material to be heated to desired temperature to that the desired current flows through the cathode for a desired amount of time, the current flowing in an arc between the cathode and the material which is to be heated to the desired temperature; and
  (j) maintaining the current flowing through the cathode in a stabilized condition.

* * * * *